Figure 1:
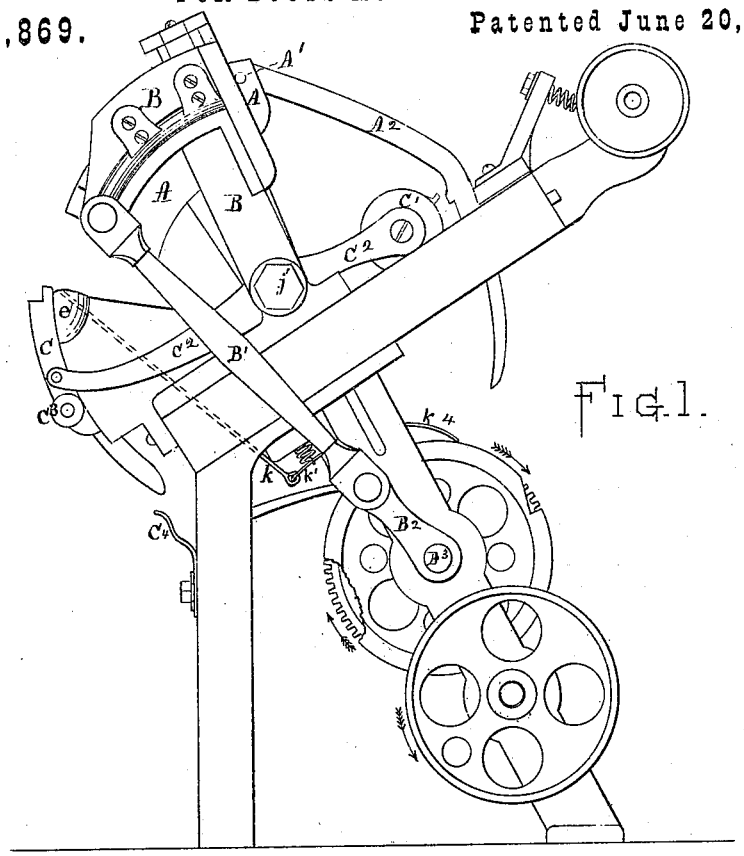
Figure 2:
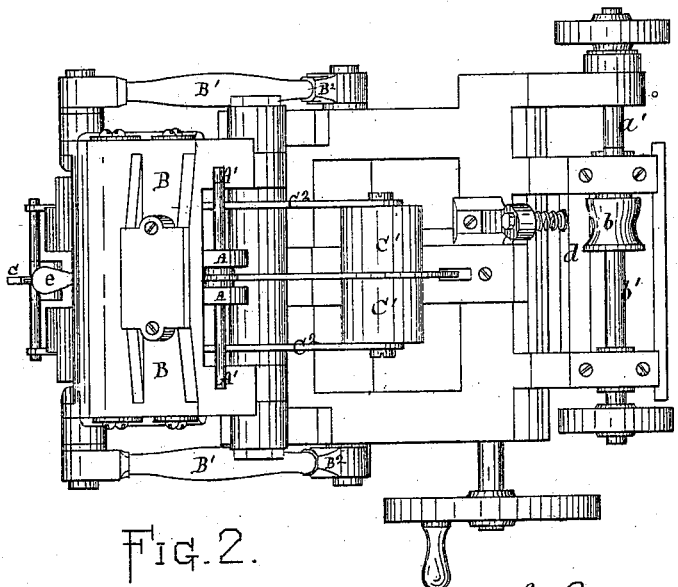
Figure 3:
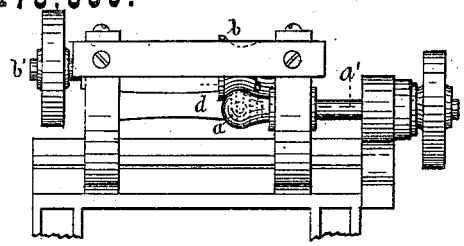
Figure 4:
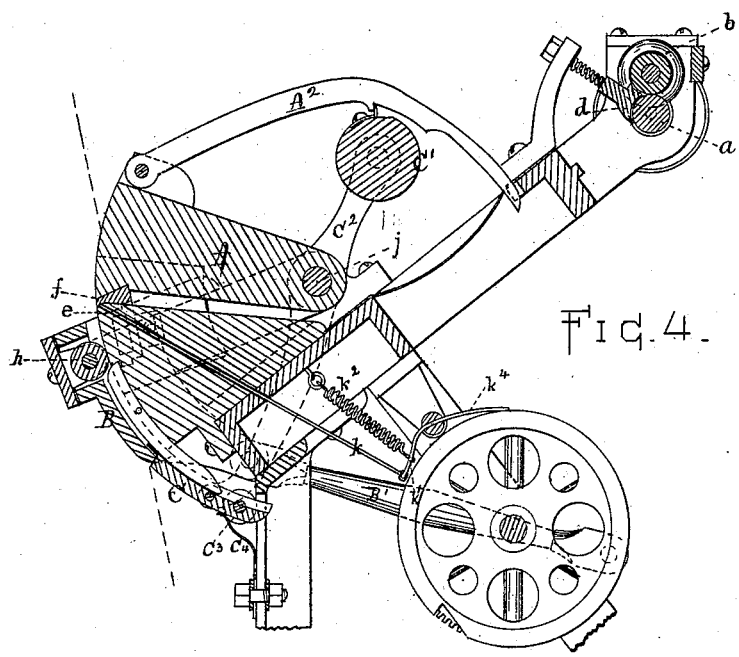
Figure 5:
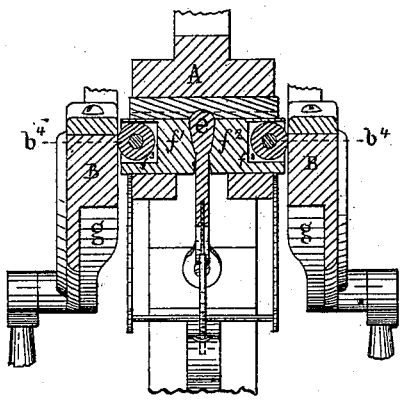

2 Sheets—Sheet 1.

J. R. MOFFITT.
MACHINERY FOR MANUFACTURING COUNTER-STIFFENERS FOR BOOTS AND SHOES.

No. 178,869. Patented June 20, 1876.

Chas. F. Sleeper.
J. E. Knox.

J. R. Moffitt,
per J. E. Maynadier
Atty.

J. R. MOFFITT.
MACHINERY FOR MANUFACTURING COUNTER-STIFFENERS FOR BOOTS AND SHOES.

No. 178,869. Patented June 20, 1876.

UNITED STATES PATENT OFFICE.

JOHN R. MOFFITT, OF CHELSEA, MASSACHUSETTS.

IMPROVEMENT IN MACHINERY FOR MANUFACTURING COUNTER-STIFFENERS FOR BOOTS AND SHOES.

Specification forming part of Letters Patent No. 178,869, dated June 20, 1876; application filed May 26, 1876.

*To all whom it may concern:*

Be it known that I, JOHN R. MOFFITT, of Chelsea, in the county of Suffolk and State of Massachusetts, have invented certain Improvements in the Manufacture of Counters or Stiffeners for Boots and Shoes, of which the following is a specification, in such full, clear, concise, and exact terms as to enable any person skilled in the art to put the same in practice, reference being had to the accompanying drawings, making a part hereof.

My invention relates to the shaping of the counter from the blank; and consists, primarily, in using a double process for effecting this, as will be more fully explained hereinafter, the first process consisting in shaping them by means of a former moving upon an axis, and suitable means for holding the blank up to the former, and the second process consisting in molding the counter so formed over a male mold of the desired form. By this double process a counter is formed which suits the wants of the consumer much better than any other known to me.

Another feature of my invention consists in flattening down the flange by means of a pressure-surface which moves in the arc of a circle, the part which supports the flange of the counter under the action of this pressure-surface formed with a surface which is curved to correspond.

Another feature of my invention consists in heating the surface of the blank when it is formed up upon the former by friction, in order to set the curves formed in the blank; and still another feature relates to the apparatus used in practicing my invention, and consists in certain combinations of parts, hereinafter more fully described.

In practicing my invention the blank is first subjected to the action of the former $a$, which is mounted upon and revolves with its shaft $a'$. This former should be roughened, as shown in the drawings, in order that it may the better hold the stock. One end of the blank is fed in between the former $a$ and the presser-roll $b$, which is mounted upon and revolves with its shaft $b^1$, and the blank is carried between the former $a$ and its presser-roll $b$, and also between the presser-surface $d$ and the former $a$, the blank being thereby curved to correspond with the curve of former.

This apparatus is the same in its general principles as that described in my Patent No. 6,162, dated December 8, 1874, and forms no part of my present invention, except in one particular, which relates to giving a more permanent set to the curves formed in the blank by means of the heat obtained from friction, and consists in moving the presser-roll $b$ at a greater speed than the speed of the former $a$, the friction thereby produced heating the blank operated upon, and making it retain more perfectly the curves imparted to it by the former, and also polishing its surface, and thereby improving the appearance of the counter.

In practice I usually mount the shaft $b^1$ and the pressure-surface $d$ upon springs, so that they may yield slightly to accommodate the variations in thickness of the stock. The former $a$ may be of a shape to both curve and flange the counter, or it may be so shaped as simply to curve the blank, leaving the flange to be formed wholly by the next branch of the process. I prefer the latter shape, which is that shown in the drawings. I usually speed the roll $b$ at three times the speed of the former $a$.

The blanks, having been thus curved, (or curved and flanged, if desired,) are taken by an attendant, who sits at the other end of the machine, and placed upon the male mold $e$, with the lower part of the counter outward; and as the head A descends, that part, $f$, of the female mold which is rigidly attached to this head is brought upon the blank, and the sides $f^1 f^2$ of the female mold, which are also carried by the head A, are forced in upon the blank, this being effected by the movement of the head B, which carries two inclined planes, $g\ g$, which act, respectively, upon the two carriers $f^3 f^3$ of the parts $f^1 f^2$ of the female mold. While the counter is thus formed over the heel part and sides of the male mold $e$, the flange is formed over the sole part of that mold by wiping over it the roll $h$, which is carried by the head B. In place of this roll, any other suitable wiping-surface may be used, but I prefer a roll, because the friction is less. And so of the female mold $f f^1 f^2$: any substitute for that may also be used which will form the counter on the male mold.

This process of shaping counters, consisting in first shaping them by means of a former, $a$, and then molding them in the exact form desired over the male mold e, constitutes the chief feature of my invention, and its great merit is, that counters can be made by my improved process not only with the proper curves to suit the trade, but also, in all other respects, of the exact shape required; and, so far as I know, I am the first to obtain this.

Heretofore counters have been made for the market either by forming them over a male mold, the process being the same in principle as the second branch of my improved process, and the apparatus the same in principle as my mold e and the means described for forming the counter over it, or else by means of a former and suitable means to hold the blank up to the former, this process being the same in principle as the first branch of my improved process, and practiced with an apparatus the same in principle as my form—a presser-roll, b, or presser-surface d; but all counters made by the first of these processes were objectionable in that the material could not, by this process, be practically curved, as is necessary in the best counters, while all counters made by the latter process, by which process the main curves desired could be very efficiently given to the back portion of the counter—that is, the curves from top to bottom, and the curves at right angles to the curves from top to bottom, at the back part of the counter—yet other portions of the counter were necessarily curved in the same way, which is objectionable, even in cheap work, and almost wholly prevents the use of such counters in several large classes of shoes.

By my improved process the curves at the back portion of the counter are properly formed, and yet the other portions of the counter are brought to the exact form desired.

I sometimes use paraffine, (supported upon the presser-surface d and against the presser-roll b,) which gradually melts, and is evenly distributed by this revolving presser-roll upon the surface of the counter, giving it a polish, and also partially waterproofing the counter. The heating of the blank by the increased speed of the presser-roll b is not, of course, essential in practicing my process, and so of the use of paraffine.

The heads A and B are each mounted upon the axis $j$. The motion of the head B on its axis $j$ is caused by the connecting-rods $B^1$, crank $B^2$, and shaft $B^3$. When the head B is at its highest point, as shown in Fig. 1, the head A is also at its highest point, it being supported by means of the cross-rod $A'$, fast to the head A, and extending partly across head B. When head B begins to descend, head A moves with it, its weight carrying it down, and both heads descend together until the part of the female mold rests upon the counter on the male mold e, which prevents the further motion of the head A, while the further motion of the head B carries the inclined planes $g\ g$ against the friction-rolls $b^4$ on the carriers $f^3$, thereby forcing inward these carriers, and the parts $f^1\ f^2$ of the female mold, against the counters upon the male mold e, and also depresses the guide-piece C and lifts its counter-weight $C^1$, the guide-piece being on one end of lever $C^2$, and its counter-weight on the other end, and when the head B is at its lowest point the studs $C^3$ are caught by the spring $C^4$, and the guide is held down until the head B rises far enough to lift the head A, and until the notched finger $A^2$ upon the head A thrusts back the counter-weight, and thereby releases the studs $C^3$ upon the spring $C^4$, when the counter-weight falls and throws the guide C back to its proper place. This is so timed that the guide C does not get back to its place until after the finished counter has been knocked off of the male mold e by the mechanism for that purpose. This mechanism is the needle $k$, which is attached to the arm $k^1$, which arm is moved against the force of the spring $k^2$ by the arm $k^3$ and cam $k^4$, so that when the shoulder of $k^4$ moves under the arm $k^3$ the spring $k^2$ imparts a quick motion upward to the arm $k^1$ and needle $k$, which knocks off the counter.

The operation will be clear without further description, except that the counter-blanks are notched, so that the attendant puts the center notch over the guide C when placing the counter upon the male mold e. The head B should be heavy enough to hold the counter firmly.

What I claim as my invention is—

1. The improved process of shaping counters above described, consisting in first giving the proper curves by a revolving former, substantially as described, and afterward giving the exact shape by forming the counter over a male mold, all as set forth.

2. The male mold e, formed with its sole surface curved as described, in combination with a pressure-surface arranged to move over it in the arc of a circle, and thereby form the bottom of a counter on a curve, all as set forth.

3. The mode of giving a more permanent set to the curves by running the presser-roll b at a greater speed than the former a, as and for the purpose described.

4. In combination with the male mold e, the heads A and B.

5. The guide C, in combination with the male mold e and mechanism for shaping the counter over that mold, substantially as described.

6. The needle $k$, in combination with the male mold e and mechanism for operating the needle, as described.

J. R. MOFFITT.

Witnesses:
CHAS. F. SLEEPER,
J. E. MAYNADIER.